(12) United States Patent
Liu et al.

(10) Patent No.: US 12,442,741 B2
(45) Date of Patent: *Oct. 14, 2025

(54) ELASTIC WAVE AND TENSILE DAMAGE TESTING SYSTEM OF ROCK COUPLED WITH SEEPAGE IN DEEP EARTH COMPLEX ENVIRONMENT

(71) Applicant: Sichuan University, Sichuan (CN)

(72) Inventors: Jianfeng Liu, Sichuan (CN); Heping Xie, Sichuan (CN); Xin He, Sichuan (CN); Lu Wang, Sichuan (CN); Lina Ran, Sichuan (CN); Chunping Wang, Sichuan (CN); Yougang Cai, Sichuan (CN); Xiangchao Shi, Sichuan (CN); Gan Feng, Sichuan (CN); Hua Li, Sichuan (CN); Xiaozhang Lei, Sichuan (CN); Jianhui Deng, Sichuan (CN)

(73) Assignee: Sichuan University, Sichuan (CN)

( * ) Notice: Subject to any disclaimer, the term of this patent is extended or adjusted under 35 U.S.C. 154(b) by 291 days.

This patent is subject to a terminal disclaimer.

(21) Appl. No.: 18/455,735

(22) Filed: Aug. 25, 2023

(65) Prior Publication Data

US 2024/0068918 A1    Feb. 29, 2024

(30) Foreign Application Priority Data

Aug. 30, 2022    (CN) .......................... 202211045003.8

(51) Int. Cl.
  *G01N 3/08*    (2006.01)
  *G01N 3/04*    (2006.01)
  *G01N 29/04*   (2006.01)

(52) U.S. Cl.
  CPC ................. *G01N 3/08* (2013.01); *G01N 3/04* (2013.01); *G01N 29/04* (2013.01);
  (Continued)

(58) Field of Classification Search
  CPC .. G01N 3/08; G01N 3/04; G01N 3/02; G01N 3/10; G01N 2203/0017; G01N 2203/0055;
  (Continued)

(56) References Cited

U.S. PATENT DOCUMENTS 12,066,424 B1 *   8/2024   Li ........................ G01N 29/223

FOREIGN PATENT DOCUMENTS

| CN | 103308388 A | 9/2013 |
|----|-------------|--------|
| CN | 206248434 U | 6/2017 |

(Continued)

*Primary Examiner* — Jonathan M Dunlap
(74) *Attorney, Agent, or Firm* — NKL Law; Allen Xue (57) ABSTRACT

A direct tensile and acoustic testing machine under rock seepage includes a sample and a support frame. A top of the support frame is fixed with a top plate, a bearing plate is provided above the top plate, the bearing plate is provided with a plurality of vertical force transferring rods, the force transferring rods vertically penetrate through the top plate and sliding fit with the top plate, lower ends of the force transferring rods are provided with a tensile base, a top of the tensile base is provided with a lower clamp holder, a bottom of the top plate is provided with an upper clamp holder, and a clamp center of the upper clamp holder overlaps with a clamp center of the lower clamp holder. An acoustic component and a seepage component are provided in the upper clamp holder and the lower clamp holder.

9 Claims, 5 Drawing Sheets

(52) U.S. Cl.
CPC ............... *G01N 2203/0017* (2013.01); *G01N 2203/0055* (2013.01); *G01N 2203/0075* (2013.01); *G01N 2203/0087* (2013.01); *G01N 2203/0256* (2013.01)

(58) Field of Classification Search
CPC ... G01N 2203/0075; G01N 2203/0087; G01N 2203/0256; G01N 2203/0067; G01N 2203/025; G01N 2203/0658; G01N 2203/0003; G01N 2203/0048; G01N 2203/0236; G01N 29/04
See application file for complete search history.

(56) References Cited

FOREIGN PATENT DOCUMENTS

| | | | | |
|---|---|---|---|---|
| CN | 108519317 A | | 9/2018 | |
| CN | 109283047 A | | 1/2019 | |
| CN | 112697671 A | | 4/2021 | |
| CN | 114486547 A | | 5/2022 | |
| CN | 115406762 A | * | 11/2022 | ............... G01N 3/02 |
| CN | 115406763 A | * | 11/2022 | ............... G01N 3/02 |
| CN | 115753400 A | * | 3/2023 | ............. G01N 29/14 |

* cited by examiner

ELASTIC WAVE AND TENSILE DAMAGE TESTING SYSTEM OF ROCK COUPLED WITH SEEPAGE IN DEEP EARTH COMPLEX ENVIRONMENT

FIELD OF THE INVENTION

The present invention belongs to the technical field of a rock direct tensile test under influence of triaxial stress and seepage, and in particular relates to a direct tensile and acoustic testing machine under rock seepage and a test method thereof.

DESCRIPTION OF THE RELATED ART

Testing of three kinds of mechanical parameters of rock, such as crush resistance, tensile strength and shear strength, is indispensable in all rock engineering constructions. A tensile test of rock samples is an important means to understand tensile load bearing capacity of rock. As one of basic mechanical parameters in engineering constructions, a tensile strength value of rock is very important for engineering design calculation. At present, there are two main methods used to determine the tensile strength value of rock: an indirect tensile method and a direct tensile method.

The indirect tensile method is also known as a Brazilian splitting method. Because of its simple operation and wide universality, it can be implemented on all conventional material compression mechanics testing machines, and it is also the only recommended test method in a national standard "Engineering Rock Mass test Method Standard". Although the Brazilian splitting method is a widely recommended test method in ISRM and "Engineering Rock Mass test Method Standard", specific test methods are different and can be divided into direct loading methods, pad strip methods and arc loading methods.

The recommended method in the "Engineering Rock Mass test Method Standard" is to add a metal pad strip between a specimen and an indenter, and is to add a cork pad between the specimen and the indenter for soft rock. Although it is to ensure that the indenter transfers a linear concentrated load to an end of the specimen, it still does not solve the problem of brittle rock ends being brittle, and a research shows that the tensile strength of the rock obtained by this method is small.

In the ISRM, it is recommended to set a contact point between the indenter and the specimen as an arc. Although this method ensures that the end of the specimen is an arc compression zone and reduces a risk of breakage of the end of the specimen to a certain extent, this method requires an arc of the indenter to match a sample size, which not only has low universality, but also leads to a high tensile strength. Although this method is simple to operate and can be carried out on all material compression mechanics test machines, it still has the following shortcomings on the whole: (1) Due to influence of an end loading zone, the accuracy of the measured tensile strength is still an unavoidable problem; (2) During a splitting process, it is difficult to ensure that the splitting surface must follow a predetermined loading surface; (3) There is no guarantee that a fracture surface must be a failure surface with the smallest bearing capacity, especially for rocks with obvious bedding and defects. Therefore, the tensile strength value measured by the indirect measurement can not fully reflect a real situation.

In order to solve the problem that results of the indirect tensile test can not fully reflect the real situation, the direct tensile method is used to test tensile mechanics properties of the rocks. However, the direct tensile method has higher requirements on a tensile function of a testing device, resulting in a failure to use an ordinary compression mechanics testing machine for test and low applicability. In order to test the tensile mechanics properties of rocks under different conditions, the applicant combines a direct tensile function of the most advanced MTS815 rock mechanics test system in the world to solve part problems existing in the test, and has obtained a number of patents such as ZL200610022224.8, U.S. Pat. No. 7,624,647B2, ZL201510068200.5, ZL201510068186.9, U.S. Pat. Nos. 9,488,560B2 and 9,488,559B2. However, for the direct tensile test of rock mechanics properties, there are still the following shortcomings: (1) Performance requirements for a mechanics test apparatus are high, and the test is carried out in a conventional material testing machine, so the universality of promotion is low; (2) An MTS815 testing machine is utilized for the direct tensile test, and in the test process, disassembly and assembly of loading parts are very tedious and need cooperation of more than one person to complete, so the whole process is time-consuming and laborious; (3) The loading parts to be disassembled and assembled are all steel modules, which are large in volume and heavy in weight, and the disassembly process may cause serious safety hazards such as an apparatus damage or personnel injury; (4) The installation and test process of the direct tensile is complicated, which requires at least 2 persons to cooperate and still requires a lot of labor; (5) In the test, due to the need to use a plurality of loading pad blocks for piling and 2 long loading chains are respectively connected with 2 tensile ends of the rock, an eccentric tensile force is easy to appear which affects the test results; and (6) In the field of test the direct tensile mechanics properties of rocks, it is currently neither possible to carry out acoustic detection in the direct tensile test of rocks, nor to carry out the direct tensile test of rocks under the action of the seepage, and there is no direct tensile testing device for rocks simultaneously under the acoustic detection and the action of seepage.

BRIEF DESCRIPTION OF THE INVENTION

The present invention aims to provide a direct tensile and acoustic testing machine under rock seepage and a test method thereof, which can ensure that the failure occurs along a part with the lowest bearing force of the sample, ensures the measurement accuracy and reduces the test cost, and can be used to carry out rock direct tensile and acoustic detection test simultaneously under triaxial seepage action.

The purpose of the present invention is realized as follows: a direct tensile and acoustic testing machine under rock seepage, comprising a sample and a support frame, wherein a top of the support frame is fixed with a top plate, a bearing plate is provided above the top plate, the bearing plate is provided with a plurality of vertical force transferring rods, the force transferring rods vertically penetrate through the top plate and sliding fit with the top plate, lower ends of the force transferring rods are provided with a tensile base, a top of the tensile base is provided with a lower clamp holder, a bottom of the top plate is provided with an upper clamp holder, and a clamp center of the upper clamp holder overlaps with a clamp center of the lower clamp holder;

an upper channel is provided inside the upper clamp holder, one end of the upper channel is communicated with the outside, the other end is provided with an acoustic transmitting probe, and a transmitting direction of the acoustic transmitting probe is downward; and a lower channel is provided inside the lower clamp holder, one end of the lower channel is communicated with the outside, the other end is provided with an acoustic receiving probe, and the acoustic receiving probe receives a vertically downward acoustic wave;

an upper end of the sample is fixed on the upper clamp holder, an upper end face of the sample is provided with a seepage outflow hole, a seepage outflow channel is provided inside the upper clamp holder, one end of the seepage outflow channel is connected with the seepage outflow hole, and the other end is communicated with the outside; a lower end of the sample is fixed on the lower clamp holder, a lower end face of the sample is provided with a seepage inflow hole, a seepage entry channel is provided inside the lower clamp holder, and one end of the seepage entry channel is connected with the seepage inflow hole, and the other end is communicated with the outside.

Further, an upper horn-shaped sealing sleeve is provided between the acoustic transmitting probe and an inner wall of the upper channel, and a lower horn-shaped sealing sleeve is provided between the acoustic receiving probe and an inner wall of the lower channel.

Further, a first probe spring is provided below the acoustic receiving probe, and a second probe spring is provided above the acoustic transmitting probe.

Further, an outflow end packer is arranged inside the seepage outflow hole, and an outflow end packer sealing ring is provided between the outflow end packer and a side wall of the seepage outflow hole; and an inflow end packer is provided inside the seepage inflow hole, and an inflow end packer sealing ring is provided between the inflow end packer and a side wall of the seepage inflow hole.

Further, the seepage outflow channel is communicated with the outside through a seepage outflow end joint; and the seepage entry channel is communicated with the outside through a seepage inflow end joint.

Further, the support frame comprises a base and a plurality of vertical columns arranged on the base, and the top plate is fixed on upper parts of the columns through first fixing nuts.

Further, the tensile base is provided with a lower ball head sliding fitted with the tensile base, and the lower clamp holder is fixed on the lower ball head; and the top plate is provided with an upper ball head sliding fitted with the top plate, and the upper clamp holder is fixed on the upper ball head.

Further, the lower clamp holder is installed on the lower ball head through a lower latch, and the upper clamp holder is installed on the upper ball head through an upper latch.

Further, the tensile base is fixed on the lower ends of the force transferring rods through second fixing nuts.

In a test method of the direct tensile and acoustic testing machine under rock seepage, one end of the sample is glued to the lower clamp holder by strong glue, the other end of the sample is glued to the upper clamp holder by the strong glue, an oil pressure protection heat shrink film is fixed on outer walls of the lower clamp holder, the sample and the upper clamp holder, then the whole rock tensile testing device is placed in a pressure chamber, the seepage outflow channel is connected with a seepage outflow tube, and the seepage entry channel is connected with a seepage inflow tube; the acoustic transmitting probe is connected to an acoustic transmitting wire, the acoustic receiving probe is connected to an acoustic receiving wire, the acoustic transmitting wire and the acoustic receiving wire are connected to an external acoustic control system, and an acoustic detection is carried out on the sample; the pressure chamber is filled with oil to apply a triaxial lateral compression stress, seepage is generated by passing a seepage medium through the seepage inflow tube, a compression load is applied to the bearing plate through an indenter of the testing machine, the compression load is transmitted through the force transferring rods to the tensile base, and the tensile base forms a tensile load on the sample, wherein the tensile load is equal to a compression load applied by a material compression mechanics testing machine; and when the sample is destroyed, the fluid entering the seepage inflow tube is shut off, the oil in the pressure chamber is pumped back, and the seepage outflow tube, the seepage inflow tube, the acoustic transmitting wire and the acoustic receiving wire are removed.

The present invention has the following advantages: 1. The present invention can carry out the rock tensile test only by using a conventional material testing machine, without adding a separate tensile test apparatus, and has wide universality, which overcomes the defect of high cost of the traditional direct tensile method apparatus.

2. The present invention adopts the direct tensile method of compression, rotary and drawing, which can ensure the failure along the part with the lowest bearing force of the sample, and overcome the defect of low accuracy of the traditional indirect tensile method.

3. The structure of the device is simple, which is mainly consisted of a steel structure; compared with a similar tensile test apparatus, the cost is low; it has a small size and a light weight, so it is easy to be moved; the operation is convenient and labor-saving, and one person can carry out the test, which reduces the use cost; it avoids accidents such as an accidental damage to the equipment and personal safety of an operator due to disassembly of heavy loading parts, which has high safety; and the tensile structure is compact, which avoids an eccentric bearing force problem that may exist in the superposition of a plurality of parts.

4. Because the present invention has a compact structure and a small volume, it can be placed in the pressure chamber of the existing triaxial testing machine, solving the problem that the rock direct tensile test cannot be carried out under the triaxial lateral stress; and the problem that the rock direct tensile test cannot be carried out simultaneously under the acoustic detection and the action of the seepage is solved by providing acoustic components and seepage components at the position of the clamp holder.

Reference numbers: 1—base; 2—column; 3—top plate; 4—first fixing nut; 5—bearing plate; 6—force transferring rod; 7—tensile base; 8—second fixing nut; 9—lower ball head; 10—lower latch; 11—lower clamp holder; 12—sample; 13—upper clamp holder; 14—upper latch; 15—upper ball head; 16—oil pressure protection heat shrink film; 17—upper channel; 18—acoustic transmitting probe;

19—upper horn-shaped sealing sleeve; 20—second probe spring; 21—acoustic receiving probe; 22—lower horn-shaped sealing sleeve; 23—first probe spring; 24—lower channel; 25—outflow end packer sealing ring; 26—outflow end packer; 27—seepage outflow channel; 28—inflow end packer sealing ring; 29—inflow end packer; 30—seepage entry channel; 31—seepage outflow end joint; 33—rock tensile testing device; 34—pressure chamber; 35—seepage outflow tube; 36—seepage inflow tube; 37—acoustic transmitting wire; 38—acoustic receiving wire.

DETAILED DESCRIPTION OF EMBODIMENTS OF THE INVENTION

The present invention is further described with reference to the accompanying drawings and embodiments.

Figure 1:
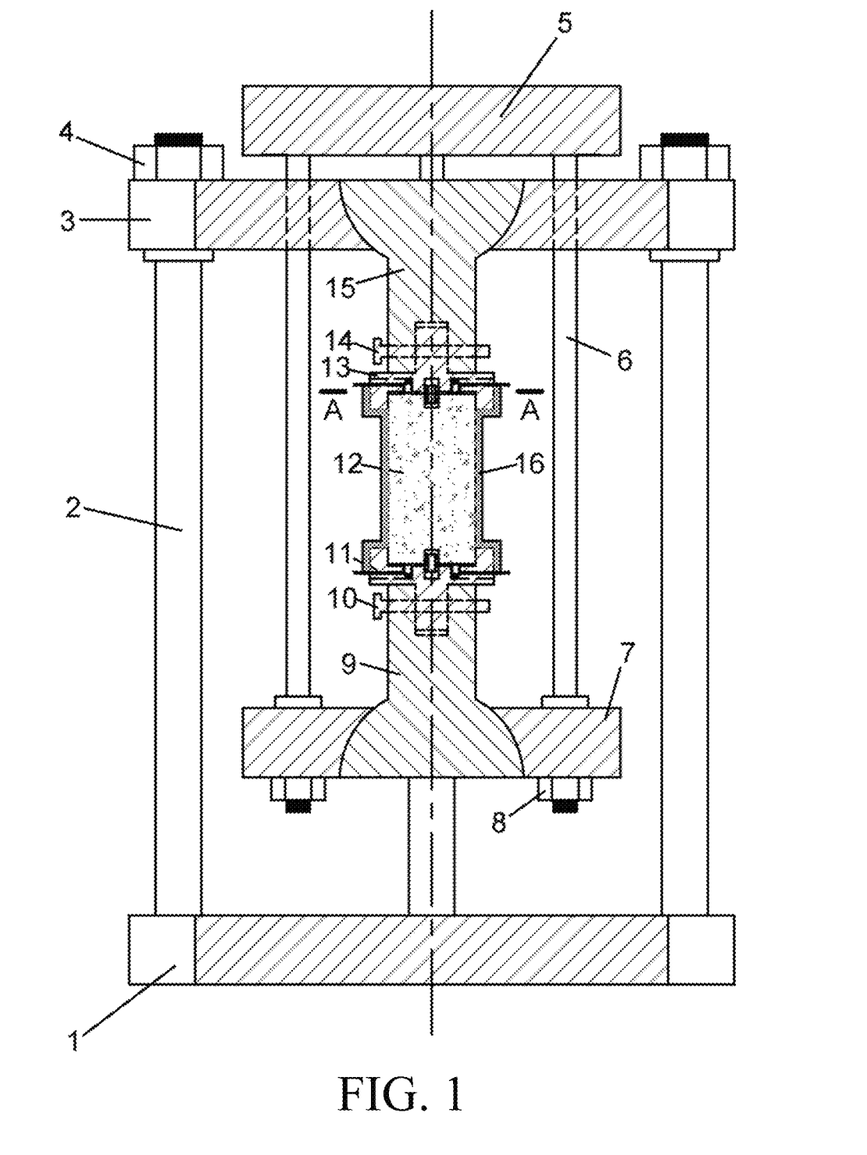
FIG. 1 is a schematic diagram of the present invention.

As shown in FIG. 1, a direct tensile and acoustic testing machine under rock seepage of the present invention comprises a sample 12 and a support frame, wherein a top of the support frame is fixed with a top plate 3, a bearing plate 5 is provided above the top plate 3, the bearing plate 5 is provided with a plurality of vertical force transferring rods 6, the force transferring rods 6 vertically penetrate through the top plate 3 and sliding fit with the top plate 3, lower ends of the force transferring rods 6 are provided with a tensile base 7, a top of the tensile base 7 is provided with a lower clamp holder 11, a bottom of the top plate 3 is provided with an upper clamp holder 13, and a clamp center of the upper clamp holder 13 overlaps with a clamp center of the lower clamp holder 11.

The support frame is used to support other parts, and can adopt various structural frames. Preferably, the support frame comprises a base 1 and a plurality of vertical columns 2 arranged on the base 1, and the top plate 3 is fixed on upper parts of the columns 2 through first fixing nuts 4. The base 1 adopts a metal plate of a certain thickness, and the columns 2 may adopt cylindrical metal rods, which may be hollow tubes. Lower ends of the columns 2 can be welded with the base 1, or a common connection method such as threaded fit can be used. Upper parts of the columns 2 are provided with external threads, which can be positioned by setting the first fixing nuts 4 on upper and lower surfaces of the top plate 3. Alternatively, the support steps can be arranged on the outer walls of the upper parts of the columns 2, the top plate 3 is placed on the support steps, and the first fixing nuts 4 are arranged on an upper surface of the top plate 3 to lock the top plate 3. The top plate 3 can be disassembled and installed, and the top plate 3 can be removed when being moved, which also facilitates adjustment of a height of the top plate 3.

Figure 2:
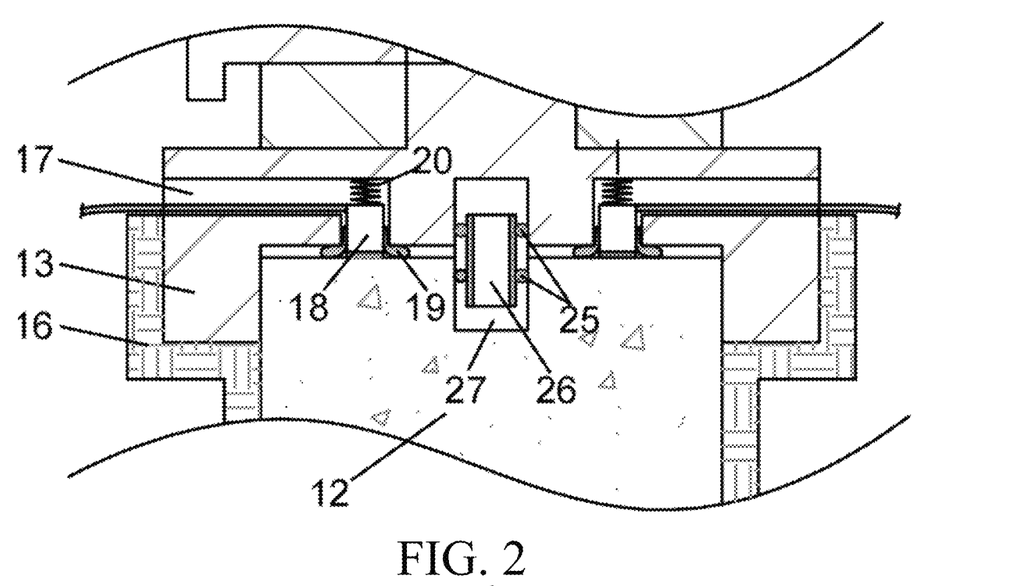
FIG. 2 is an enlarged schematic diagram of an upper clamp holder of the present invention.

The base 1 and top plate 3 can be a square, circular, triangle and other shapes, preferably the triangle with rounded angles as shown in FIG. 2. The number of columns 2 can be 3, 4, etc., preferably 3, which can position the top plate 3 more stably and fix it better. A smaller number of columns 2 are used, and space between the columns 2 is larger, which reserves operational space so that it is convenient to install other measurement sensors on the rock sample to be tested.

The bearing plate 5 is directly subjected to a compression load. The bearing plate 5, the force transferring rods 6 and the tensile base 7 constitute a tensile frame which converts the compression load into a tensile load. Upper ends of the force transferring rods 6 can be welded with the bearing plate 5, or can be connected by threaded connections, screw connection or positioning latch connections. The bearing plate 5 and the tensile base 7 can be a triangular, rectangular and other shapes, preferably a circular, and there are 3 force transferring rods 6, which can realize stable load transfer and prevent a tilt of the tensile frame. Lower ends of the force transferring rods 6 are provided with external threads, and the tensile base 7 is fixed to the lower ends of the force transferring rods 6 through second fixing nuts 8 for easy disassembly.

The bearing plate 5 is located above the top plate 3, and a spacing between the bearing plate 5 and the top plate 3 is appropriate to ensure that the compression load of the bearing plate 5 can be transferred to the force transferring rods 6. The force transferring rods 6 and the top plate 3 are sliding fitted, and fit clearance is as small as possible to ensure that the compression load is transferred vertically downward along the force transferring rods 6.

The upper clamp holder 13 and the lower clamp holder 11 are used for clamping the rock sample 12. The upper clamp holder 13 and the lower clamp holder 11 are both provided with a clamping blind hole. The clamping blind hole may be a circular hole or a square slot depended on a shape of sample 12. The upper clamp holder 13 and the lower clamp holder 11 may be installed directly on the top plate 3 and the tensile base 7, respectively. As a preferred implementation, the tensile base 7 is provided with a lower ball head 9 sliding fitted with the tensile base 7, and the lower clamp holder 11 is fixed on the lower ball head 9; and the top plate 3 is provided with an upper ball head 15 sliding fitted with the top plate 3, and the upper clamp holder 13 is fixed on the upper ball head 15.

The lower ball head 9 and the upper ball head 15 are both provided with a hemispherical curved surface, while the top plate 3 is provided with a groove matched with the curved surface of the upper ball head 15, the tensile base 7 is provided with a groove matched with the curved surface of the lower ball head 9, so that the lower ball head 9 and the upper ball head 15 can be flexibly rotated within a certain angle range. After the processing of the sample 12, it is impossible to completely ensure that the two end faces are perpendicular to an axis of the sample 12. After the lower clamp holder 11 and the upper clamp holder 13 are bonded to upper and lower end faces of the sample 12 respectively, it would cause that an axis of the tensile load cannot completely coincide with the axis of the sample 12. If there is a certain included angle, it would lead to an eccentric load and affect results. After setting the lower ball head 9 and the upper ball head 15, if the axis of the tensile load deviates from the axis of the sample 12 during the test, the lower ball head 9 and the upper ball head 15 can automatically rotate under the action of the load, so that a load direction is consistent with an axial direction of the sample 12, so as to ensure the accuracy of the test results.

The lower clamp holder 11 can be welded to the lower ball head 9. Preferably, the lower clamp holder 11 is installed on the lower ball head 9 through a lower latch 10, and the upper clamp holder 13 is installed on the upper ball head 15 through an upper latch 14. A latch connection can be easily and quickly disassembled. In the test, the upper latch 14 and the lower latch 10 can be pulled out first, the lower clamp holder 11 and the upper clamp holder 13 are removed. After the two ends of the sample 12 are fixed to the lower clamp holder 11 and the upper clamp holder 13 respectively, the lower clamp holder 11 and the upper clamp holder 13 are then connected to the lower ball head 9 and the upper ball head 15 respectively through the latches. In this way, the installation of sample 12 is more convenient, which can ensure that the installation of sample 12 is stable and firm, and the installation position is in a high precision to ensure accuracy of measurement. In addition, the lower clamp holder 11 and the upper clamp holder 13 for fixing the samples 12 of different shapes and sizes can be replaced, so that the device can be used for tensile tests on the samples 12 of various shapes and sizes.

Figure 6:
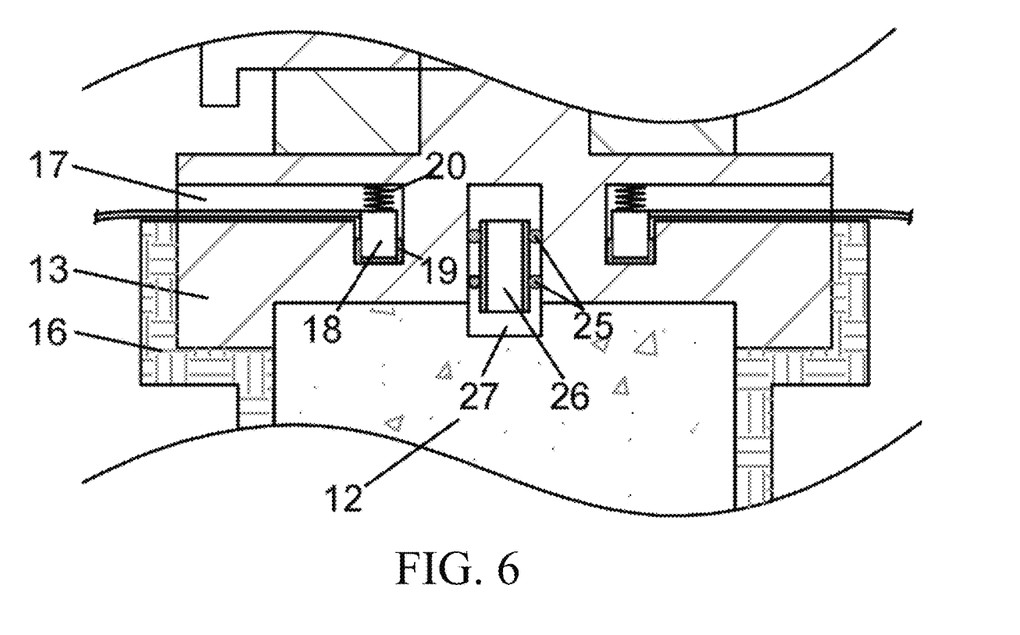
FIG. 6 is a schematic diagram of another installation method of an acoustic transmitting probe.
Figure 7:
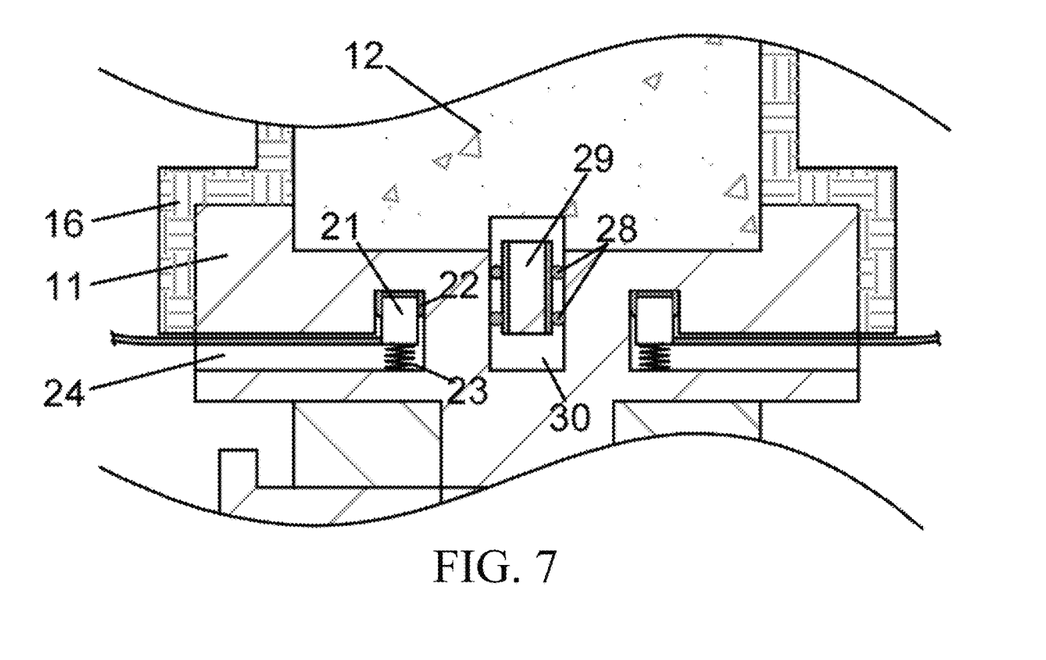
FIG. 7 is a schematic diagram of another installation method of an acoustic receiving probe.

In order to realize an acoustic detection and action of the seepage, the present invention provides an acoustic component and a seepage component at the lower clamp holder 11 and the upper clamp holder 13. As specifically shown in FIG. 2 and FIG. 3, an upper channel 17 is provided inside the upper clamp holder 13, one end of the upper channel 17 is communicated with the outside, the other end is provided with an acoustic transmitting probe 18, the upper channel 17 may extend to a bottom of the clamping chamber of the upper clamp holder 13, and a transmitting direction of the acoustic transmitting probe 18 is downward; and a lower channel 24 is provided inside the lower clamp holder 11, one end of the lower channel 24 is communicated with the outside, the other end is provided with an acoustic receiving probe 21, the lower channel 24 may extend to a bottom of the clamping chamber of the lower clamp holder 11, and the acoustic receiving probe 21 receives an acoustic wave transmitted by the corresponding transmitting probe; and the transmitting end may also be used as a receiving end, and the receiving end may also be used as a transmitting end. In addition, the acoustic receiving probe 21 and the acoustic transmitting probe 18 may also not be in contact with the sample 12, as shown in FIG. 6 and FIG. 7.

Figure 3:
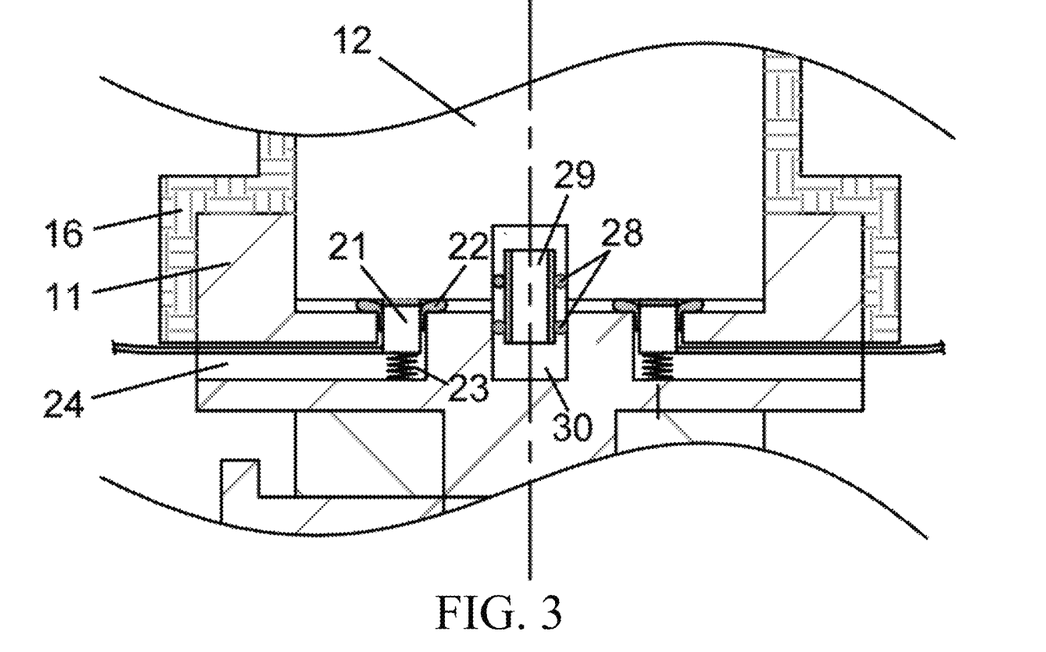
FIG. 3 is an enlarged schematic diagram of a lower clamp holder of the present invention.

The acoustic transmitting probe 18 is used to transmit an acoustic wave, and the acoustic receiving probe 21 is used to receive the acoustic wave. The upper channel 17 and the lower channel 24 both comprise a horizontal segment and a vertical segment in an L-shape. The horizontal segment is communicated with the outside, and the vertical segment is communicated with the clamping cavity of the clamp holder. The acoustic transmitting probe 18 and the acoustic receiving probe 21 are provided in the vertical segment so that the acoustic transmitting probe 18 can generate an acoustic wave downward. The acoustic receiving probe 21 can receive the acoustic wave transmitted by the acoustic transmitting probe 18 to realize the acoustic detection.

Figure 4:
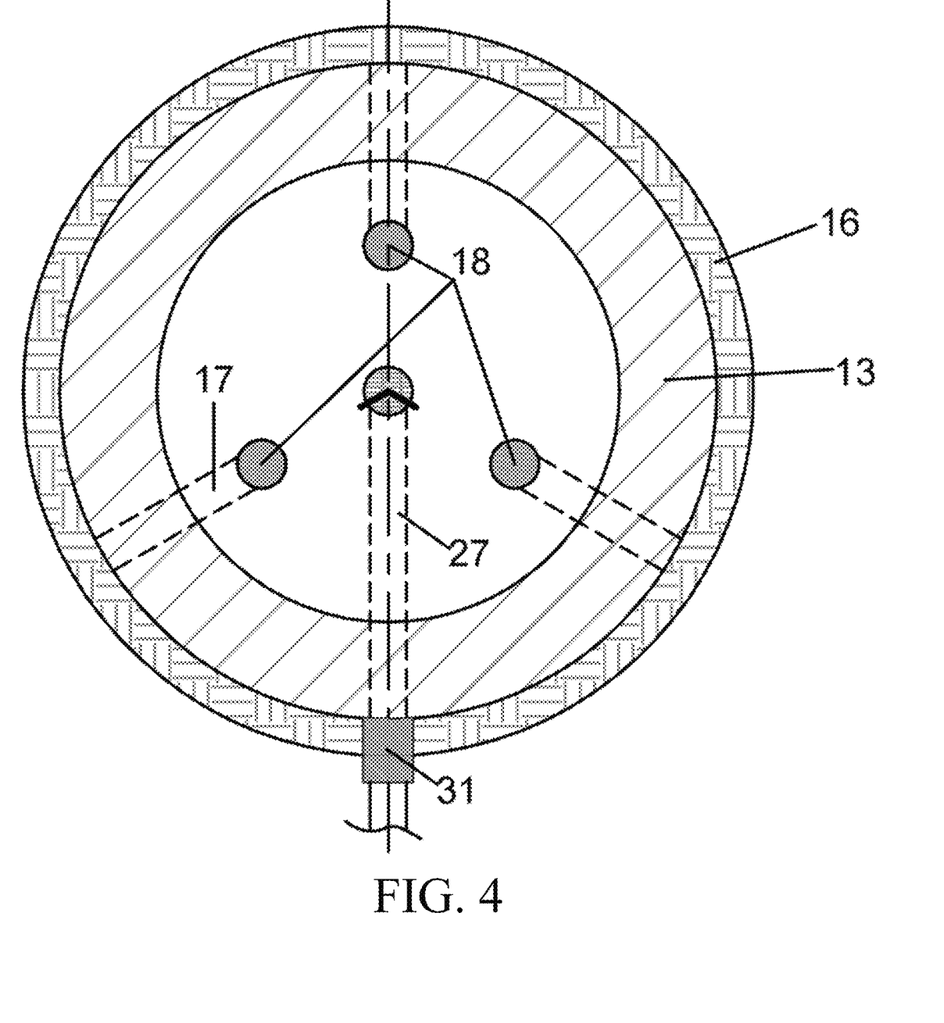
FIG. 4 is sectional schematic diagram of A-A in FIG. 1.

As shown in FIG. 4, the number of acoustic transmitting probes 18 is three and the three acoustic transmitting probes 18 are uniformly arranged around a center of the clamping cavity. The acoustic receiving probes 21 are also set up with 4 identities, with each acoustic receiving probe 21 corresponding to one acoustic transmitting probe 18.

Since the upper and lower end faces of sample 12 should be bonded by strong glue, in order to prevent the strong glue from entering the upper channel 17 and the lower channel 24, an upper horn-shaped sealing sleeve 19 is arranged between the acoustic transmitting probe 18 and an inner wall of the upper channel 17, and a lower horn-shaped sealing sleeve 22 is arranged between the acoustic receiving probe 21 and an inner wall of the lower channel 24.

In order to improve a contact coupling effect and installation stability of the acoustic receiving probe 21 and acoustic transmitting probe 18, a first probe spring 23 is provided below the acoustic receiving probe 21, and a second probe spring 20 is provided above the acoustic transmitting probe 18. Upper ends of the first probe spring 23 and the second probe spring 20 are both in tight contact with a top surface of the horizontal segment, and lower ends are in contact with the high acoustic receiving probe 21 and the acoustic transmitting probe 18, thereby pressing the high acoustic receiving probe 21 and the acoustic transmitting probe 18.

An upper end of the sample 12 is fixed on the upper clamp holder 13, an upper end face of the sample 12 is provided with a seepage outflow hole, a seepage outflow channel 27 is provided inside the upper clamp holder 13, one end of the seepage outflow channel 27 is connected with the seepage outflow hole, and the other end is communicated with the outside; a lower end of the sample 12 is fixed on the lower clamp holder 11, a lower end face of the sample 12 is provided with a seepage inflow hole, a seepage entry channel 30 is provided inside the lower clamp holder 11, and one end of the seepage entry channel 30 is connected with the seepage inflow hole, and the other end is communicated with the outside.

During the test, seepage medium can be passed into the seepage inflow hole through the seepage entry channel 30 to generate the seepage, and the seepage outflow channel 27 is used to discharge the seepage medium. Since the upper and lower end faces of sample 12 should be bonded by the strong glue, in order to prevent the strong glue from entering the seepage outflow hole and the seepage inflow hole, an outflow end packer 26 is arranged inside the seepage outflow hole, and an outflow end packer sealing ring 25 is provided between the outflow end packer 26 and a side wall of the seepage outflow hole; and an inflow end packer 29 is provided inside the seepage inflow hole, and an inflow end packer sealing ring 28 is provided between the inflow end packer 29 and a side wall of the seepage inflow hole. The number of the outflow end packer sealing rings 25 and the number of the inflow end sealer rings 28 are both multiple to ensure good sealing.

As shown in FIG. 4, in order to facilitate the connection of the seepage outflow channel 27 and the seepage entry channel 30 with the external seepage tube, the seepage outflow channel 27 is communicated with the outside through a seepage outflow end joint 31; and the seepage entry channel 30 is communicated with the outside through a seepage inflow end joint.

In the direct tensile and acoustic testing machine under rock seepage of the present invention, the compression load is converted into the tensile load through the tensile frame consisted of the bearing plate 5, a force transferring rods 6 and the tensile base 7, and the load applied to the sample 12 is equivalent to the load in an existing direct tensile test, which can ensure a failure occurs along a part with the lowest bearing force of the sample and overcome the low accuracy of the traditional indirect tensile method.

Figure 5:
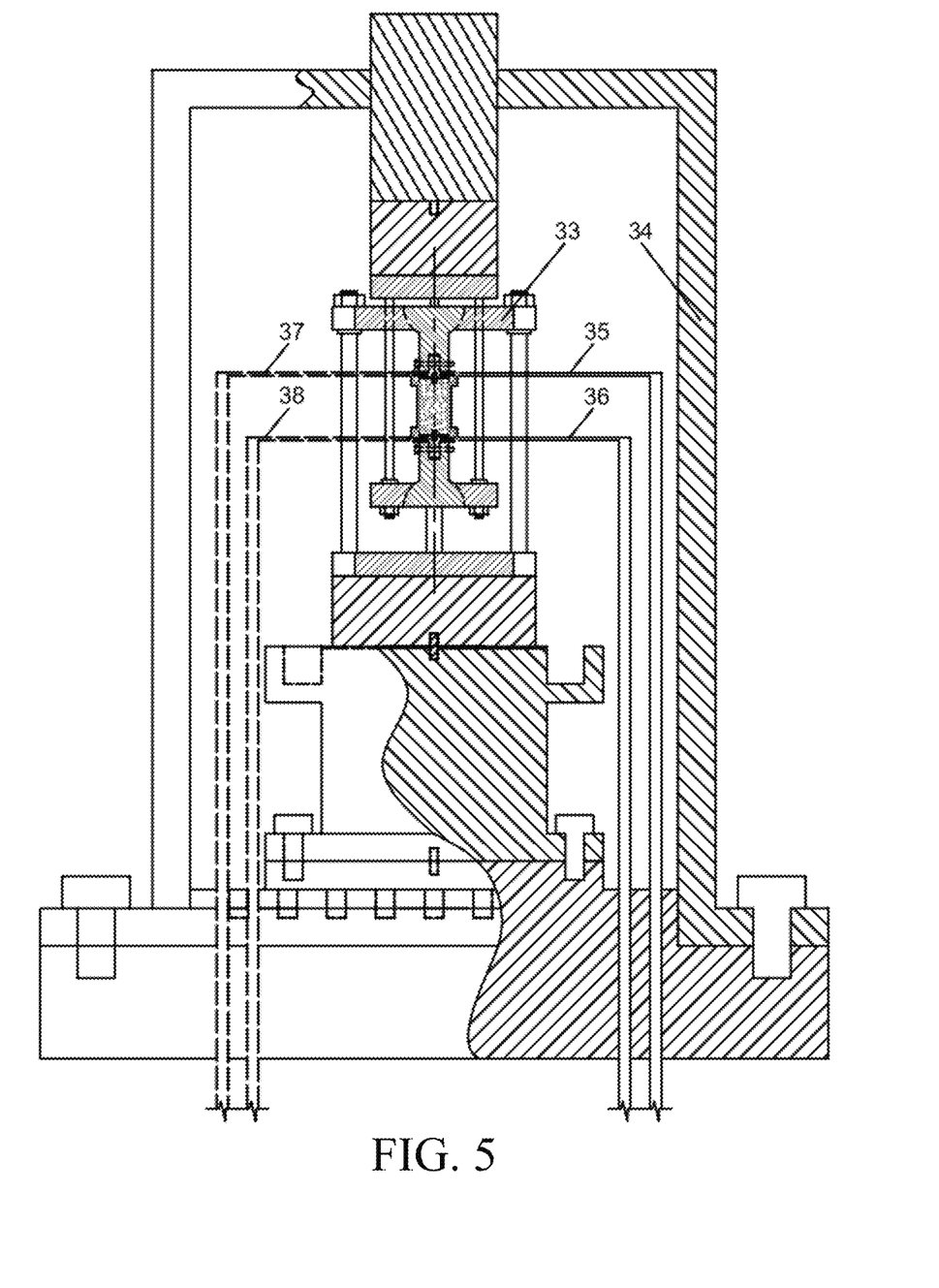
FIG. 5 is a schematic diagram when a test is carried out in the present invention.

In addition, the present invention has a simple structure, a low cost, a compact structure and a small volume, and can be put into a conventional triaxial testing machine for a seepage test. The triaxial testing machine comprises a pressure chamber 34, and a top of the pressure chamber 34 is provided with a pressure head.

The test method of the above direct tensile and acoustic testing machine under rock seepage is as follows: as shown in FIG. 5, one end of the sample 12 is bonded to the lower clamp holder 11 by the strong glue, and the other end of the sample 12 is bonded to the upper clamp holder 13 by the strong glue. When fixing the sample 12, the lower clamp holder 11 and the upper clamp holder 13 may not be removed from the testing device, but this would cause the operation to be not convenient, and an adhesive strength between the two ends of sample 12 and the clamp holder is difficult to be uniform. Therefore, the lower clamp holder 11 and the upper clamp holder 13 are preferably removed before the test in the present invention. During the test, one end of the sample 12 is bonded to the lower clamp holder 11 by the strong glue, and the other end of the sample 12 is bonded to the upper clamp holder 13 by the strong glue. Then the upper clamp holder 13 is connected to the upper ball head 15 by using the upper latch 14, and the lower clamp holder 11 is connected to the lower ball head 9 by using the lower latch 10.

Then the oil pressure protection heat shrink film 16 is fixed on the outer walls of the lower clamp holder 11, sample 12 and the upper clamp holder 13, and then the whole rock tensile testing device 33 is placed in the pressure chamber 34. The seepage outflow channel 27 is connected with the seepage outflow tube 35, and the seepage entry channel 30 is connected with the seepage inflow tube 36. The acoustic transmitting probe 18 is connected to the acoustic transmitting wire 37, the acoustic receiving probe 21 is connected to the acoustic receiving wire 38, the acoustic transmitting wire 37 and the acoustic receiving wire 38 are connected to an external acoustic control system, and the acoustic detection is carried out on the sample 12.

The pressure chamber 34 is filled with oil to apply the triaxial lateral compression stress, the seepage is generated by passing the seepage medium through the seepage outflow tube 35, and the compression load is applied to the bearing plate 5 through an indenter of the testing machine. The compression load is transferred to the tensile base 7 through the force transferring rods 6, and the tensile base 7 forms a tensile load on the sample 12, and the size of the tensile load is equal to a compression load applied by a material compression mechanics testing machine. The real-time acoustic detection is realized during the tensile process. When the sample 12 is destroyed, the fluid entering the seepage inflow tube is shut off, the oil in the pressure chamber 34 is pumped back, the seepage outflow tube 35, the seepage inflow tube 36, the acoustic transmitting wire 37 and the acoustic receiving wire 38 are removed, and the sample 12 is taken out.

The foregoing is merely illustrative of the preferred embodiments of the present invention and is not intended to be limiting of the present invention, and for those skilled in the art, the present invention may have various changes and modifications. Any modifications, equivalent substitutions, improvements, and the like within the spirit and principles of the invention are intended to be included within the scope of the present invention.

The invention claimed is:

1. A direct tensile and acoustic testing machine under rock seepage, comprising a sample and a support frame,
wherein a top of the support frame is fixed with a top plate, a bearing plate is provided above the top plate, the bearing plate is provided with a plurality of vertical force transferring rods, the plurality of vertical force transferring rods vertically penetrate through the top plate and are in a sliding fit with the top plate and are affixed to a tensile base, a top of the tensile base is provided with a lower clamp holder, a bottom of the top plate is provided with an upper clamp holder, and a clamp center of the upper clamp holder overlaps with a clamp center of the lower clamp holder;
an upper channel is provided inside the upper clamp holder, one end of the upper channel is communicated with the outside, the other end is provided with an acoustic transmitting probe, and a transmitting direction of the acoustic transmitting probe is downward; and
a lower channel is provided inside the lower clamp holder, one end of the lower channel is communicated with the outside, the other end is provided with an acoustic receiving probe, and the acoustic receiving probe is configured to receive an acoustic wave from the acoustic transmitting probe;
an upper end of the sample is affixed to the upper clamp holder, an upper end face of the sample is provided with a seepage outflow hole, a seepage outflow channel is provided inside the upper clamp holder, one end of the seepage outflow channel is connected with the seepage outflow hole, and the other end is communicated with the outside;
a lower end of the sample is affixed to the lower clamp holder, a lower end face of the sample is provided with a seepage inflow hole, a seepage entry channel is provided inside the lower clamp holder, and one end of the seepage entry channel is connected with the seepage inflow hole, and the other end is communicated with the outside, and
wherein an upper horn-shaped sealing sleeve is provided between the acoustic transmitting probe and an inner wall of the upper channel, and a lower horn-shaped sealing sleeve is provided between the acoustic receiving probe and an inner wall of the lower channel.

2. The direct tensile and acoustic testing machine under rock seepage according to claim 1, wherein a first probe spring is provided below the acoustic receiving probe, and a second probe spring is provided above the acoustic transmitting probe.

3. The direct tensile and acoustic testing machine under rock seepage according to claim 1, wherein an outflow end packer is arranged inside the seepage outflow hole, and an outflow end packer sealing ring is provided between the outflow end packer and a side wall of the seepage outflow hole; and an inflow end packer is provided inside the seepage inflow hole, and an inflow end packer sealing ring is provided between the inflow end packer and a side wall of the seepage inflow hole.

4. The direct tensile and acoustic testing machine under rock seepage according to claim 1, wherein the seepage outflow channel is communicated with the outside through a seepage outflow end joint; and the seepage entry channel is communicated with the outside through a seepage inflow end joint.

5. The direct tensile and acoustic testing machine under rock seepage according to claim 1, wherein the support frame comprises a base and a plurality of columns, each column having a first end affixed to the base a second end affixed to the top plate by a first fixing nut.

6. The direct tensile and acoustic testing machine under rock seepage according to claim 1, wherein the tensile base is provided with a lower ball head sliding fitted with the tensile base, and the lower clamp holder is affixed to the lower ball head; and the top plate is provided with an upper ball head sliding fitted with the top plate, and the upper clamp holder is affixed to the upper ball head.

7. The direct tensile and acoustic testing machine under rock seepage according to claim 6, wherein the lower clamp holder is installed on the lower ball head through a lower latch, and the upper clamp holder is installed on the upper ball head through an upper latch.

8. The direct tensile and acoustic testing machine under rock seepage according to claim 1, wherein a lower end of each force transferring rods is affixed to the tensile by a second fixing nut.

9. A test method of the direct tensile and acoustic testing machine under rock seepage according to claim 1, comprising:

gluing a first end of the sample to the lower clamp holder and a second end of the sample to the upper clamp holder;

affixing an oil pressure protection heat shrink film on an outer wall of the lower clamp holder, the sample and the upper clamp holder;

placing the rock tensile testing device in a pressure chamber;

connecting the seepage outflow channel with a seepage outflow tube;

connecting the seepage entry channel with the seepage inflow tube;

passing a gas flow at an elevated pressure through the seepage inflow tube to produce seepage;

connecting the acoustic transmitting probe to an acoustic transmitting wire, and the acoustic receiving probe to an acoustic receiving wire, wherein the acoustic transmitting wire and the acoustic receiving wire are connected to an acoustic control system; and carrying out an acoustic detection on the sample;

wherein the pressure chamber is filled with oil to apply a triaxial lateral compression stress, a compression load is applied to the bearing plate through an indenter of the testing machine, the compression load is transmitted through the plurality of force transferring rods to the tensile base, and the tensile base forms a tensile load on the sample, wherein the tensile load is equal to a compression load applied by a material compression mechanics testing machine.

* * * * *